United States Patent
Biess et al.

(10) Patent No.: US 12,110,038 B2
(45) Date of Patent: Oct. 8, 2024

(54) VIRTUAL FIELDS DRIVING RELATED OPERATIONS

(71) Applicant: AUTOBRAINS TECHNOLOGIES LTD, Tel Aviv-Jaffa (IL)

(72) Inventors: Armin Biess, Yafo (IL); Isaac Misri, Yafo (IL); Julius Engelsoy, Yafo (IL); Igal Raichelgauz, Tel Aviv (IL)

(73) Assignee: AUTOBRAINS TECHNOLOGIES LTD., Tel Aviv-Jaffa (IL)

( * ) Notice: Subject to any disclaimer, the term of this patent is extended or adjusted under 35 U.S.C. 154(b) by 0 days.

(21) Appl. No.: 18/350,714

(22) Filed: Jul. 11, 2023

(65) Prior Publication Data

US 2023/0365156 A1    Nov. 16, 2023

Related U.S. Application Data

(63) Continuation-in-part of application No. 17/823,069, filed on Aug. 29, 2022.

(60) Provisional application No. 63/368,156, filed on Jul. 11, 2022, provisional application No. 63/260,839, filed on Sep. 1, 2021.

(51) Int. Cl.
*B60W 60/00* (2020.01)
*B60W 50/14* (2020.01)

(52) U.S. Cl.
CPC .......... *B60W 60/001* (2020.02); *B60W 50/14* (2013.01); *B60W 2050/146* (2013.01); *B60W 2554/00* (2020.02)

(58) Field of Classification Search
None
See application file for complete search history.

(56) References Cited

U.S. PATENT DOCUMENTS

| | | | |
|---|---|---|---|
| 2018/0111612 A1* | 4/2018 | Jiang | B60W 30/12 |
| 2019/0047553 A1* | 2/2019 | Yokoyama | B60W 10/20 |
| 2020/0117211 A1* | 4/2020 | Paglieroni | G05D 1/0259 |

FOREIGN PATENT DOCUMENTS

WO    WO-2022065085 A1 *    3/2022

OTHER PUBLICATIONS

HERE Technologies. "HD Live Map for Autonomous Cars." Youtube, Sep. 26, 2016, https://www.youtube.com/watch?v=8dyo_S3Vxlw. (Year: 2016).*
Google English Translation of WO 2022065085 A1 (Year: 2022).*
Merged Copy and English Translation of DE 102016205442 A1 (Year: 2017).*

* cited by examiner

*Primary Examiner* — James J Lee
*Assistant Examiner* — Andrew Sang Kim
(74) *Attorney, Agent, or Firm* — Reches Patents

(57) ABSTRACT

A method for virtual fields driving related operations, the method includes (i)obtaining coarse navigation information regarding at least a segment of a path of a vehicle to a destination of the vehicle; and (ii) determining one or more virtual forces, by using a processing circuitry and based on the coarse navigation information, the one or more virtual forces are for use in applying a driving related operation of the vehicle, the one or more virtual forces belong to a virtual physical model and represent, at least in part, the coarse navigation information.

16 Claims, 14 Drawing Sheets

```
┌─────────────────────────────────────────────────────────────┐
│ Collecting human data taken to be expert demonstrations for │
│              how to handle the scenario 210                 │
└─────────────────────────────────────────────────────────────┘
                              │
                              ▼
┌─────────────────────────────────────────────────────────────┐
│  Constructing a loss function that punishes the difference  │
│  between a kinematic variable resulting from the perception │
│  field model and the corresponding kinematic variable of the│
│                  human demonstrations 220                   │
└─────────────────────────────────────────────────────────────┘
                              │
                              ▼
┌─────────────────────────────────────────────────────────────┐
│  Updating parameters of the perception field and auxiliary  │
│   functions to minimize the loss function by means of some  │
│     optimization algorithm such as gradient descent 230     │
└─────────────────────────────────────────────────────────────┘
```

```
┌─────────────────────────────────────────────────────┐
│  Detecting closest lane or side of road sample      │
│  points $(X_{L,i}, Y_{L,i})$ and $(X_{R,i}, Y_{R,i})$ where L is left, R is │
│  right and index I refers to the sample points. 610 │
└─────────────────────────────────────────────────────┘
                          │
                          ▼
┌─────────────────────────────────────────────────────┐
│  Concatenating left lane input vectors $(X_{L,i}, Y_{L,i})$ and │
│  $V_{ego}$ into $X_L$ and concatenating right lane input │
│  vectors $(X_{R,i}, Y_{R,i})$ and $V_{ego}$ into $X_R$. 620 │
└─────────────────────────────────────────────────────┘
                          │
                          ▼
┌─────────────────────────────────────────────────────┐
│  Calculating lane perception fields $f_\theta(X_L)$ and $f_\theta(X_R)$. │
│  This is done by one or more NNs. 630               │
└─────────────────────────────────────────────────────┘
                          │
                          ▼
┌─────────────────────────────────────────────────────┐
│  Constructing a differential equation that describes│
│  ego acceleration applied on the ego vehicle: a =   │
│  $f_\theta(X_L) + f_\theta(X_R)$ 640                │
└─────────────────────────────────────────────────────┘
                          │
                          ▼
┌─────────────────────────────────────────────────────┐
│  Applying RL to evaluate the perception fields by   │
│   implementing the acceleration in a simulated      │
│    environment and evaluating the outcome - for     │
│     example by applying a reward function. The      │
│  evaluating may include determining to update the   │
│  perception fields - by updating the weights of the │
│                 one or more NNs 670                 │
└─────────────────────────────────────────────────────┘
```

Receiving a sequence of panoptically segmented images over short time window from ego perspective (images obtained by the ego vehicle), relative distance to individual objects $X_{rel,I}$ 710

Applying spatio-temporal CNN to individual instances (objects) to capture high-level spatio-temporal features $X_i$. 720

Computing individual perception fields $f_\theta(X_i, i)$ and sum $\Sigma f_\theta(X_{rel,I}, X_i, i)$ 730

Constructing a differential equation that describes ego acceleration applied on the ego vehicle: $a = \Sigma f_\theta(X_{rel,I}, X_i, i)$. 740

Applying RL to evaluate the perception fields by implementing the acceleration in a simulated environment and evaluating the outcome - for example by applying a reward function. The evaluating may include determining to update the perception fields - by updating the weights of the one or more NNs 770

```
┌─────────────────────────────────────────────────────────────────┐
│ Receiving a location of the ego vehicle X_ego, the speed of the │
│ ego vehicle V_ego, the location of the nearest vehicle in front│
│ of the ego vehicle X_CIPV, and the speed of the nearest vehicle│
│       in front of the ego vehicle V_CIPV  910                   │
└─────────────────────────────────────────────────────────────────┘
                              │
                              ▼
┌─────────────────────────────────────────────────────────────────┐
│  Calculating the relative location X_rel = X_ego − X_CIPV, and  │
│     the and the relative speed V_rel = V_ego − V_CIPV.  920     │
└─────────────────────────────────────────────────────────────────┘
                              │
                              ▼
┌─────────────────────────────────────────────────────────────────┐
│   Calculating, by a first NN, a perception field function       │
│ g_θ(X_rel,V_CIPV). Calculating, by a second NN, an auxiliary    │
│ function h_ψ(V_rel). Multiplying g_θ(X_rel,V_CIPV) by h_ψ(V_rel)│
│  to provide a target acceleration (which equals the target      │
│                        force)  930                              │
└─────────────────────────────────────────────────────────────────┘

┌─────────────────────────────────────────────────────────────────┐
│  Computing ego trajectory given initial conditions (t;x₀,v₀) 960│
└─────────────────────────────────────────────────────────────────┘
                              ┊
                              ▼
┌─────────────────────────────────────────────────────────────────┐
│   Computing a loss function = Σ((t;x₀,v₀)) − x(t;x₀,v₀))²  970  │
└─────────────────────────────────────────────────────────────────┘

VIRTUAL FIELDS DRIVING RELATED OPERATIONS

CROSS REFERENCE

This application is a continuation in part of U.S. patent application Ser. No. 17/823,069 filing date Aug. 29 2022, that claims priority from U.S. provisional application 63/260,839 which is incorporated herein by reference. This application claims priority from U.S. provisional patent Ser. No. 63/368,156 filing date Jul. 11, 2022 which is incorporated herein in its entirety.

BACKGROUND

Autonomous vehicles (AVs) could help vastly reduce the number of traffic accidents and $CO_2$ emissions as well as contribute to a more efficient transportation system. However, today's candidate AV technologies are not scalable in the following three ways:

Limited field of view, lighting and weather challenges, and occlusions all lead to detection error and noisy localization/kinematics. In order to deal with such poor real-world perception output, one approach to AV technology is to invest in expensive sensors and/or to integrate specialized infrastructure into the road network. However, such an endeavor is very costly and—in the case of infrastructure—geographically limited, and therefore cannot lead to generally accessible AV technology.

AV technology which is not based on costly hardware and infrastructure relies entirely on machine learning and hence data to handle real-world situations. In order to deal with detection error as well as to learn a good enough driving policy for the complex task of driving, a vast amount of data and computational resources are required and still there are edge cases that are not handled correctly. The common denominator in these edge cases is that the machine learning model does not generalize well to unseen or confusing situations and due to the black-box nature of deep neural networks it is difficult to analyze faulty behavior.

Current road-ready automated driving is implemented in the form of separate ADAS functions such as ACC, AEB, and LCA. To arrive at fully autonomous driving would require seamlessly joining existing ADAS functions together as well as covering any currently non-automated gaps by adding more such functions (e.g. lane change, intersection handling etc.). In short, current automated driving is not based on a holistic approach that can readily be extended to produce full autonomous driving.

BRIEF DESCRIPTION OF THE DRAWINGS

The embodiments of the disclosure will be understood and appreciated more fully from the following detailed description, taken in conjunction with the drawings in which:

FIG. 2 illustrates an example of a method;
FIGS. 6-9 illustrate examples of situations and of perception fields.

DESCRIPTION OF EXAMPLE EMBODIMENTS

Figure 1:
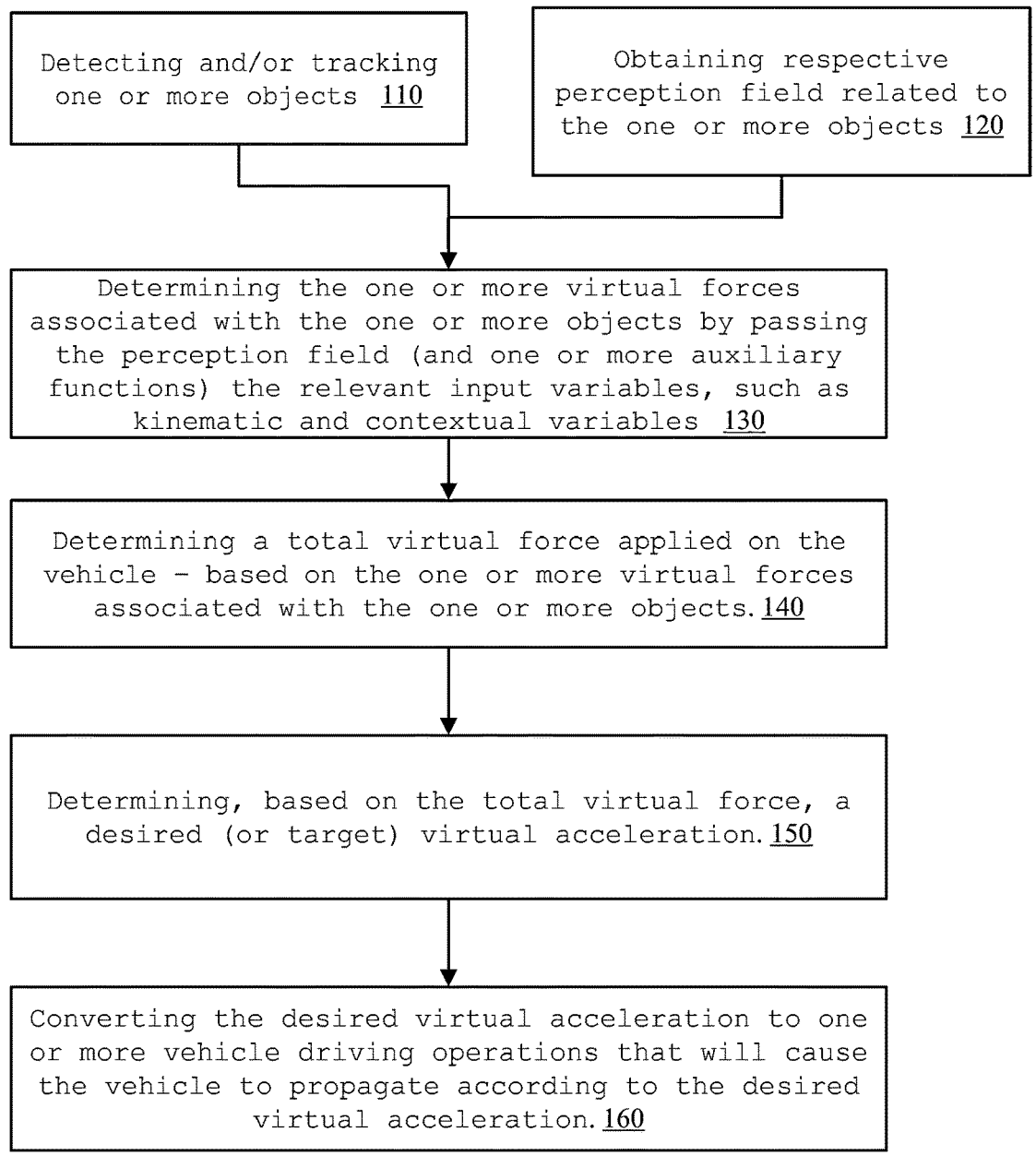
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit.

A media unit may be an example of sensed information unit (SIU). Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to a sensed information unit (SIU). The SIU may be of any kind and may be sensed by any type of sensors—such as a visual light camera, an audio sensor, a sensor that may sense infrared, radar imagery, ultrasound, electro-optics, radiography, LIDAR (light detection and ranging), a thermal sensor, a passive sensor, an active sensor, etc. The sensing may include generating samples (for example, pixel, audio signals) that represent the signal that was transmitted, or otherwise reach the sensor. The SIU may be one or more images, one or more video clips, textual information regarding the one or more images, text describing kinematic information about an object, and the like.

Object information may include any type of information related to an object such as but not limited to a location of the object, a behavior of the object, a velocity of the object, an acceleration of the object, a direction of a propagation of the object, a type of the object, one or more dimensions of the object, and the like. The object information may be a raw SIU, a processed SIU, text information, information derived from the SIU, and the like.

An obtaining of object information may include receiving the object information, generating the object information, participating in a processing of the object information, processing only a part of the object information and/or receiving only another part of the object information.

The obtaining of the object information may include object detection or may be executed without performing object detection.

A processing of the object information may include at least one out of object detection, noise reduction, improvement of signal to noise ratio, defining bounding boxes, and the like.

The object information may be received from one or more sources such as one or more sensors, one or more communication units, one or more memory units, one or more image processors, and the like.

The object information may be provided in one or more manners—for example in an absolute manner (for example—providing the coordinates of a location of an object), or in a relative manner—for example in relation to a vehicle (for example the object is located at a certain distance and at a certain angle in relation to the vehicle.

The vehicle is also referred to as an ego—vehicle.

The specification and/or drawings may refer to a processor or to a processing circuitry. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

Although successful driving is contingent upon circumnavigating surrounding road objects based on their location and movement, humans are notoriously bad at estimating kinematics. We suspect that humans employ an internal representation of surrounding objects in the form of virtual force fields that immediately imply action, thus circumventing the need for kinematics estimation. Consider a scenario in which the ego vehicle drives in one lane and a vehicle diagonally in front in an adjacent lane starts swerving into the ego lane. The human response to brake or veer off would be immediate and instinctive and can be experienced as a virtual force repelling the ego from the swerving vehicle. This virtual force representation is learned and associated with the specific road object.

Inspired by the above considerations we propose the novel concept of perception fields. Perception fields are a learned representation of road objects in the form of a virtual force field that is "sensed" through the control system of the ego vehicle in the form of ADAS and/or AV software. A field is here defined as a mathematical function which depends on spatial position (or an analogous quantity)

An example of an inference method 100 is illustrates in FIG. 1 and include:

Method 100 may be executed per one or more frames of an environment of the vehicle.

Step 110 of method 100 may include detecting and/or tracking one or more objects (including, for example, one or more road users). The detecting and/or tracking may be done in any manner. The one or more objects may be any object that may affect the behavior of the vehicle. For example—a road user (pedestrian, another vehicle), the road and/or path on which the vehicle is progressing (for example the state of the road or path, the shape of the road—for example a curve, a straight road segments), traffic signs, traffic light, road crossings, a school, a kindergarten, and the like. Step 110 may include obtaining additional information such as kinematic and contextual variables related to the one or more objects. The obtaining may include receiving or generating. The obtaining may include processing the one or more frames to generate the kinematic and contextual variables.

It should be noted that step 110 may include obtaining he kinematic variables (even without obtaining the one or more frames).

Method 100 may also include step 120 of obtaining respective perception field related to the one or more objects. Step 120 may include determining which mapping between objects and should be retrieved and/or sued, and the like.

Step 110 (and even step 120) may be followed by step 130 of determining the one or more virtual forces associated with the one or more objects by passing the perception field (and one or more virtual physical model functions) the relevant input variables, such as kinematic and contextual variables.

Step 130 may be followed by step 140 of determining a total virtual force applied on the vehicle—based on the one or more virtual forces associated with the one or more objects. For example—step 140 may include performing a vector weighted sum (or other function) on the one or more virtual forces associated with the one or more objects.

Step 140 may be followed by step 150 of determining, based on the total virtual force, a desired (or target) virtual acceleration—for example based on the equivalent of Newton's second law. The desired virtual acceleration may be a vector—or otherwise have a direction.

Step 150 may be followed by step 160 of converting the desired virtual acceleration to one or more vehicle driving operations that will cause the vehicle to propagate according to the desired virtual acceleration.

For example—step 160 may include translating the desired acceleration to acceleration or deceleration or changing direction of progress of the vehicle—using gas pedal movement, brake pedal movement and/or steering wheel angle. The translation may be based on a dynamics model of the vehicle with a certain control scheme.

The advantages of perception fields are include, for example—explainability, generalizability and a robustness to noisy input.

Explainability. Representing ego movement as the composition of individual perception fields implies decomposing actions into more fundamental components and is in itself a significant step towards explainability. The possibility to visualize these fields and to apply intuition from physics in order to predict ego motion represent further explainability as compared to common end-to-end, black-box deep learning approaches. This increased transparency also leads to passengers and drivers being able to trust AV or ADAS technology more.

Generalizability. Representing ego reactions to unknown road objects as repellent virtual force fields constitutes an inductive bias in unseen situations. There is a potential advantage to this representation in that it can handle edge cases in a safe way with less training. Furthermore, the perception field model is holistic in the sense that the same approach can be used for all aspects of the driving policy. It can also be divided into narrow driving functions to be used in ADAS such as ACC, AEB, LCA etc. Lastly, the composite nature of perception fields allows the model to be trained on atomic scenarios and still be able to properly handle more complicated scenarios.

Robustness to noisy input: Physical constraints on the time evolution of perception fields in combination with potential filtering of inputs may lead to better handling of noise in the input data as compared to pure filtering of localization and kinematic data.

Physical or virtual forces allow for a mathematical formulation—for example—in terms of a second order ordinary differential equation comprising a so called dynamical system. The benefits of representing a control policy as such is that it is susceptible to intuition from the theory of dynamical systems and it is a simple matter to incorporate external modules such as prediction, navigation, and filtering of in-puts/outputs.

An additional benefit to the perception field approach is that it is not dependent on any specific hardware, and not computationally more expensive than existing methods.

Training Process

The process for learning perception fields can be of one of two types or a combination thereof, namely behavioral cloning (BC) and reinforcement learning (RL). BC approximates the control policy by fitting a neural network to observed human state-action pairs whereas RL entails learning by trial and error in a simulation environment without reference to expert demonstrations.

One can combine these two classes of learning algorithms by first learning a policy through BC to use it as an initial policy to be fine-tuned using RL. Another way to combine the two approaches is to first learn the so called reward function (to be used in RL) through behavioral cloning to infer what constitutes desirable behavior to humans, and later to train through trial and error using regular RL. This latter approach goes under the name of inverse RL (IRL).

FIG. 2 is an example of a training method 200 employed for learning through BC.

Method 200 may start by step 210 of collecting human data taken to be expert demonstrations for how to handle the scenario.

Step 210 may be followed by step 220 of constructing a loss function that punishes the difference between a kinematic variable resulting from the perception field model and the corresponding kinematic variable of the human demonstrations.

Step 220 may be followed by step 230 of updating parameters of the perception field and auxiliary functions (that may be virtual physical model functions that differ from perception fields) to minimize the loss function by means of some optimization algorithm such as gradient descent.

Figure 3:
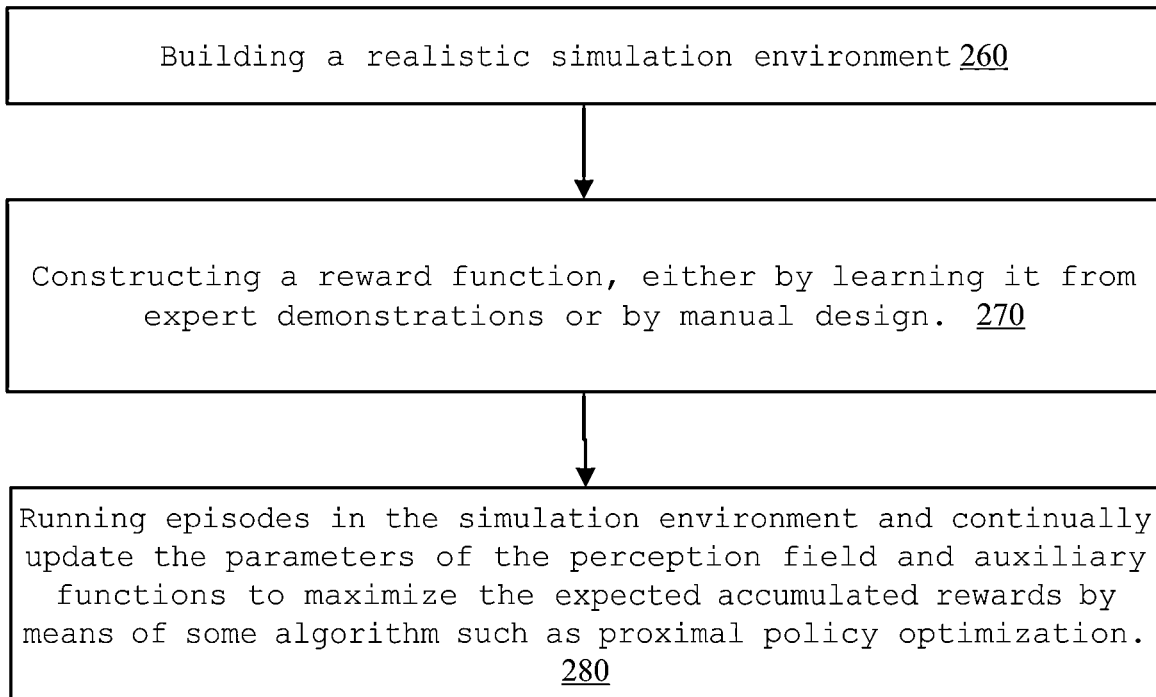
FIG. 3 illustrates an example of a method.

FIG. 3 is an example of a training method 250 employed for reinforcement learning.

Method 250 may start by step 260 of building a realistic simulation environment.

Step 260 may be followed by step 270 of constructing a reward function, either by learning it from expert demonstrations or by manual design.

Step 270 may be followed by step 280 of running episodes in the simulation environment and continually update the parameters of the perception field and auxiliary functions to maximize the expected accumulated rewards by means of some algorithm such as proximal policy optimization.

Figure 4:
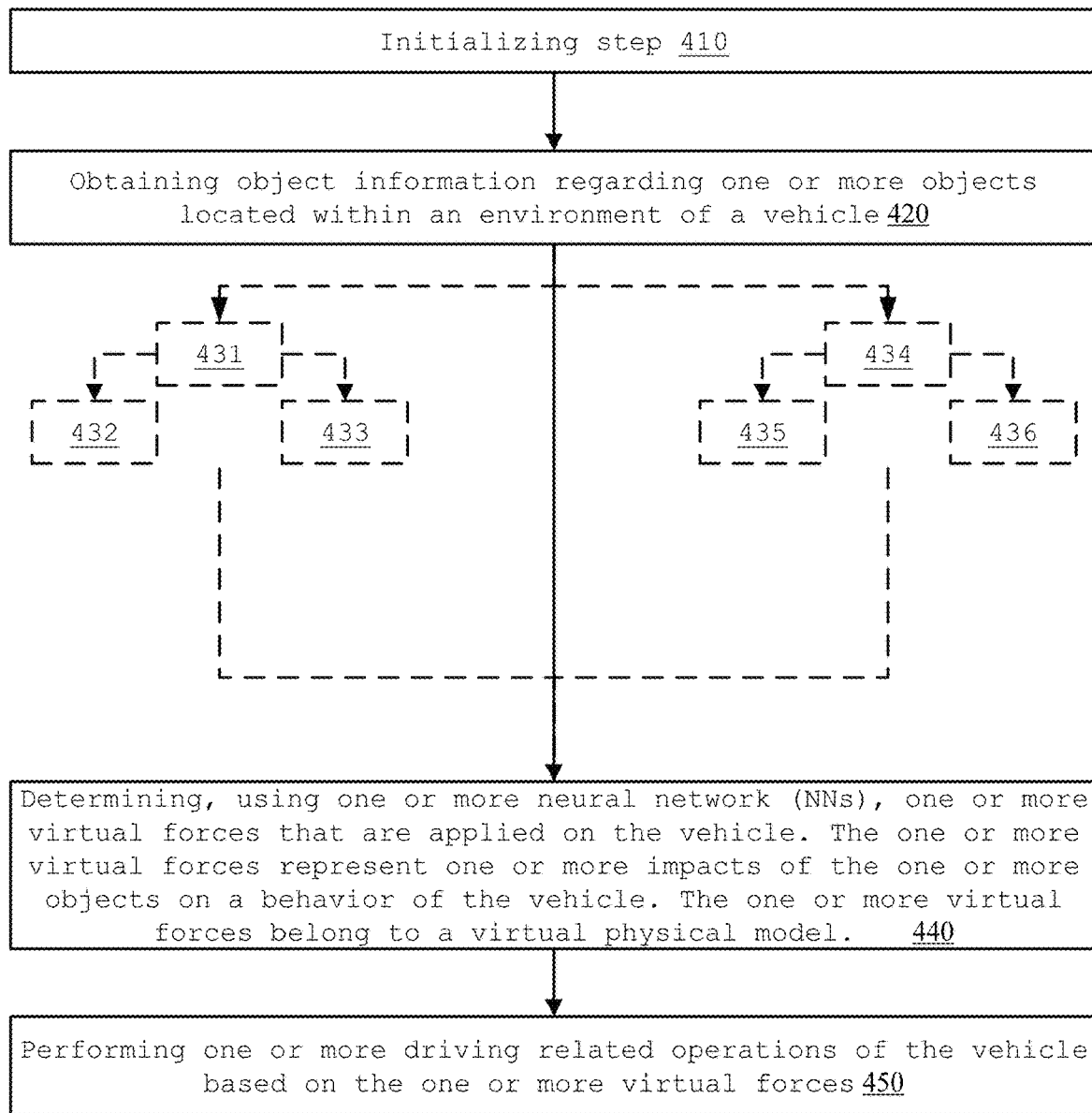
FIG. 4 illustrates an example of a method.

FIG. 4 illustrates an example of method 400.

Method 400 may be for perception fields driving related operations.

Method 400 may start by initializing step 410.

Initializing step 410 may include receiving a group of NNs that are trained to execute step 440 of method 400.

Alternatively, step 410 may include training a group of NNs that to execute step 440 of method 400.

Various example of training the group of NNs are provided below.

The group of NNs may be trained to map the object information to the one or more virtual forces using behavioral cloning.

The group of NNs may be trained to map the object information to the one or more virtual forces using reinforcement learning.

The group of NNs may be trained to map the object information to the one or more virtual forces using a combination of reinforcement learning and behavioral cloning.

The group of NNs may be trained to map the object information to the one or more virtual forces using a reinforcement learning that has a reward function that is defined using behavioral cloning.

The group of NNs may be trained to map the object information to the one or more virtual forces using a reinforcement learning that has an initial policy that is defined using behavioral cloning.

The group of NNs may be trained to map the object information to the one or more virtual forces and one or more virtual physical model functions that differ from the perception fields.

The group of NN may include a first NN and a second NN, wherein the first NN is trained to map the object information to the one or more perception fields and the second NN was trained to map the object information to the one or more virtual physical model functions.

Initializing step 410 may be followed by step 420 of obtaining object information regarding one or more objects located within an environment of a vehicle. Step 410 may be repeated multiple times—and the following steps may also repeated multiple times. The object information may include video, images, audio, or any other sensed information.

Step 420 may be followed by step 440 of determining, using one or more neural network (NNs), one or more virtual forces that are applied on the vehicle.

The one or more NNs may be the entire group of NNs (from initialization step 410) or may be only a part of the group of NNs—leaving one or more non-selected NNs of the group.

The one or more virtual forces represent one or more impacts of the one or more objects on a behavior of the vehicle. The impact may be a future impact or a current impact. The impact may cause the vehicle to change its progress.

The one or more virtual forces belong to a virtual physical model. The virtual physical model is a virtual model that may virtually apply rules of physics (for example mechanical rules, electromagnetic rules, optical rules) on the vehicle and/or the objects.

Step 440 may include at least one of the following steps:
Calculating, based on the one or more virtual forces applied on the vehicle, a total virtual force that is applied on the vehicle.
Determining a desired virtual acceleration of the vehicle based on an total virtual acceleration that is applied on the vehicle by the total virtual force. The desired virtual acceleration may equal the total virtual acceleration—or may differ from it.
Method 400 may also include at least one of step 431, 432, 433, 434, 435 and 436.
Step 431 may include determining a situation of the vehicle, based on the object information.
Step 431 may be followed by step 432 of selecting the one or more NNs based on the situation.
Additionally or alternatively, step 431 may be followed by step 433 of feeding the one or more NNs with situation metadata.
Step 434 may include detecting a class of each one of the one or more objects, based on the object information.
Step 434 may be followed by step 435 of selecting the one or more NNs based on a class of at least one object of the one or more objects.
Additionally or alternatively, step 434 may be followed by step 436 of feeding the one or more NNs with class metadata indicative of a class of at least one object of the one or more objects.
Step 440 may be followed by step 450 of performing one or more driving related operations of the vehicle based on the one or more virtual forces.
Step 450 may be executed without human driver intervention and may include changing the speed and/or acceleration and/or the direction of progress of the vehicle. This may include performing autonomous driving or performing advanced driver assistance system (ADAS) driving operations that may include momentarily taking control over the vehicle and/or over one or more driving related unit of the vehicle. This may include setting, without or without human driver involvement, an acceleration of the vehicle to the desired virtual acceleration.
Step 440 may include suggesting to a driver to set an acceleration of the vehicle to the desired virtual acceleration.

Figure 5:
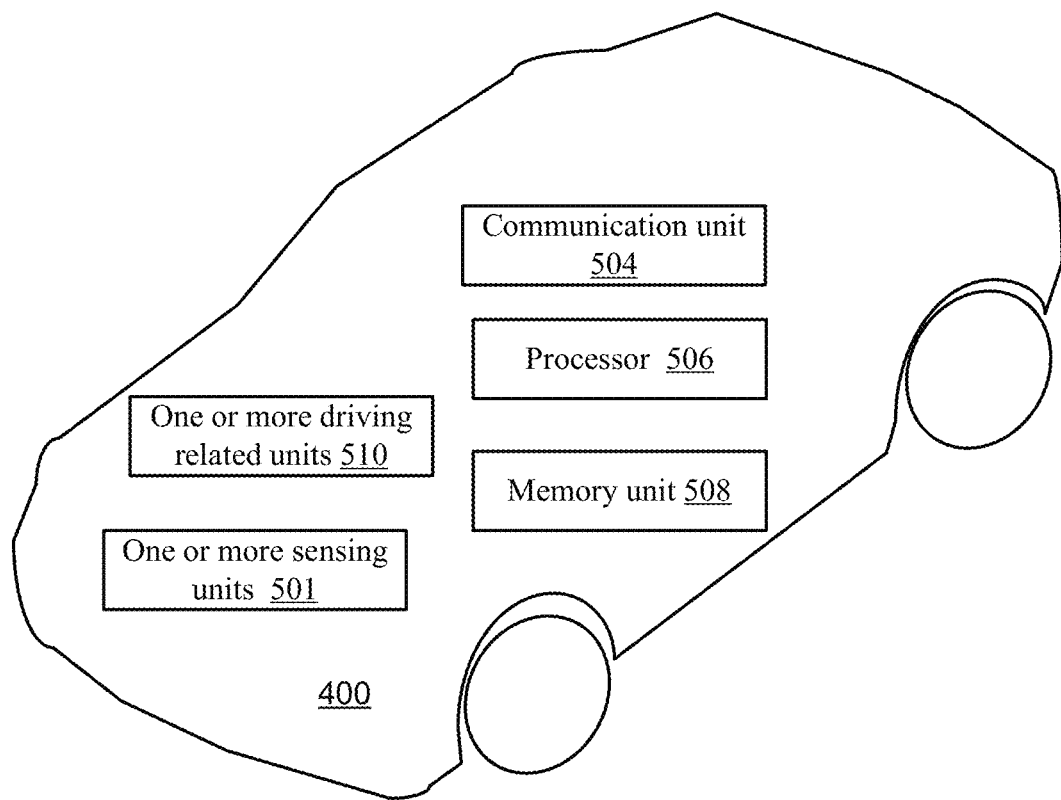
FIG. 5 is an example of a vehicle.

FIG. 5 is an example of a vehicle. The vehicle may include one or more sensing units 501, one or more driving related units 510 (such as autonomous driving units, ADAS units, and the like, a processor 560 configured to execute any of the methods, a memory unit 508 for storing instructions and/or method results, functions and the like, and a communication unit 504.

FIG. 6 illustrate examples of a method 600 for lane centering RL with lane sample points as inputs. The lane sample points are located within the environment of the vehicle.

The RL assumes a simulation environment that generated input data in which an agent (ego vehicle) can implement its learned policy (perception fields).

Method 600 may start by step 610 of detecting closest lane or side of road sample points $(X_{L,i}, Y_{L,i})$ and $(X_{R,i}, Y_{R,i})$ where L is left, R is right and index i refers to the sample points. The velocity of the ego vehicle (previously referred to as the vehicle) is denoted $V_{ego}$.

Step 610 may be followed by step 620 of concentrating left lane input vectors $(X_{L,i}, Y_{L,i})$ and $V_{ego}$ into $X_L$ and concentrating right lane input vectors $(X_{R,i}, Y_{R,i})$ and $V_{ego}$ into $X_R$.

Step 620 may be followed by step 630 of calculating lane perception fields $f_\theta(X_L)$ and $f_\theta(X_R)$. This is done by one or more NNs.

Step 630 may be followed by step 640 of constructing a differential equation that describes ego acceleration applied on the ego vehicle: $a = f_\theta(X_L) + f_\theta(X_R)$.

This may be the output of the inference process. Step 640 may be followed by step 450 (not shown).

The method may include updating the one or more NNs. In this case the RL may assume a reward function that is either learnt based on expert demonstrations or handcrafted), in the example of FIG. 6 the reward function may increase for every timestamp in which the ego vehicle maintains its lane.

The updating may include step 670 of implementing, in a simulation environment and the RL learning algorithm records what happens in the next time step including the obtaining reward.

Step 670 may include using a specific RL algorithm (for example PPO, SAC, TTD3 to sequentially update the network parameters θ in order to maximize average award.

FIG. 7 illustrates method 700 for multi-object RL with visual input.

Step 710 of method 700 may include receiving a sequence of panoptically segmented images over short time window from ego perspective (images obtained by the ego vehicle), relative distance to individual objects $X_{rel,i}$.

Step 710 may be followed by step 720 of applying spatio-temporal CNN to individual instances (objects) to capture high-level spatio-temporal features $X_i$.

Step 720 may be followed by step 730 of computing individual perception fields $f_\theta(X_i, i)$ and sum $\Sigma f_\theta(X_{rel,i}, X_i, i)$.

Step 730 may be followed by step 740 of constructing a differential equation that describes ego acceleration applied on the ego vehicle: $a = \Sigma f_\theta(X_{rel,i}, X_i, i)$.

This may be the output of the inference process. Step 740 may be followed by step 450 (not shown).

The method may include updating the one or more network parameters θ using some RL process.

The method may include step 760 of implementing a in the simulation environment and the RL learning algorithm records what happens in the next time step, including the obtained reward.

The RL may assume a reward function that is either learned based on expert demonstrations or handcrafted.

Step 760 may be followed by step 770 of using specific RL algorithm such as PPO, SAC, TTD3 to sequentially update the network parameters θ in order to maximize average reward.

Figure 8:
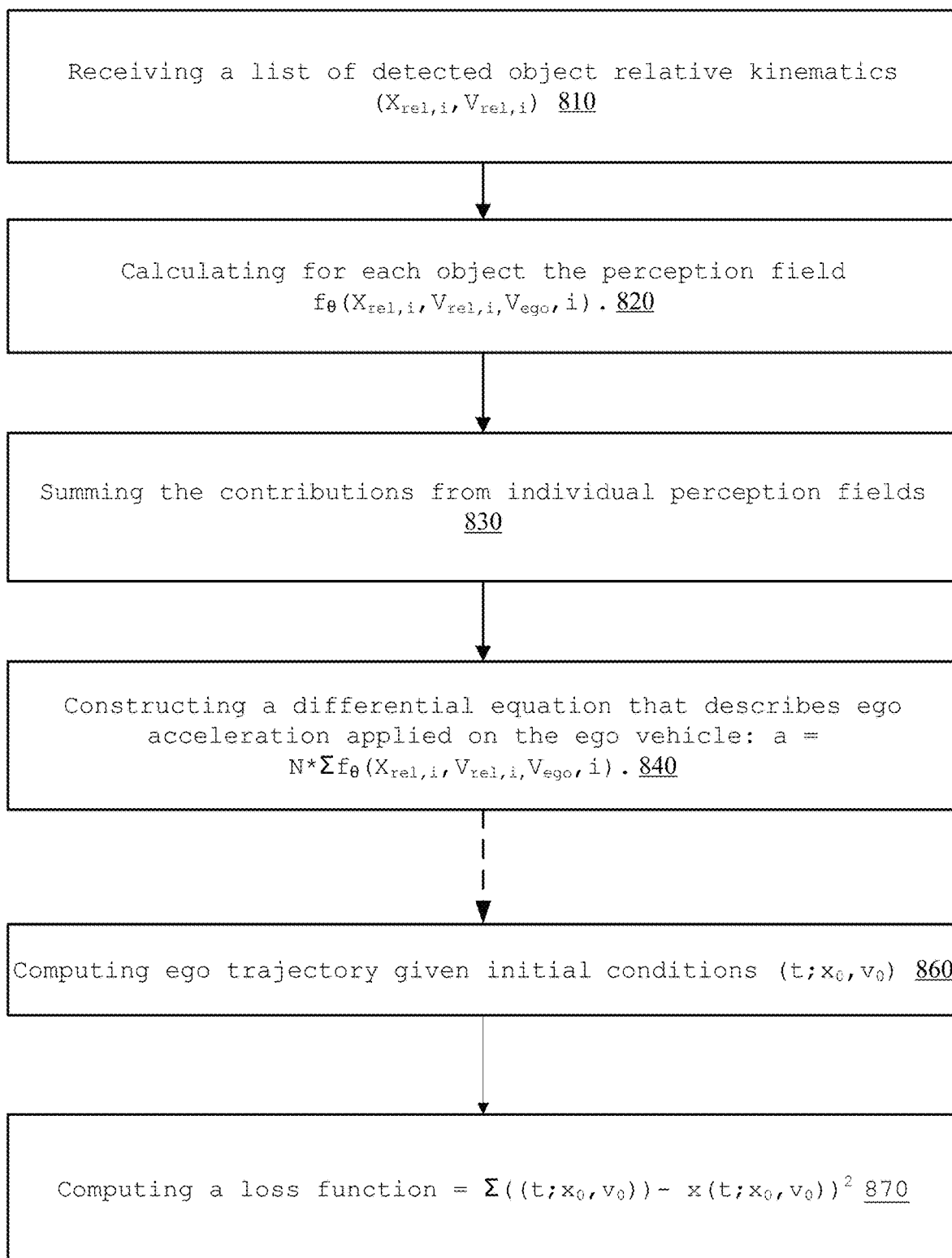

FIG. 8 illustrates method 800 for multi-object BC with kinematics input.

Step 810 of method 800 may include receiving a list of detected object relative kinematics $(X_{rel,i}, V_{rel,i})$ wherein $X_{rel,i}$ is a relative location of detected object i—in relation to the ego vehicle and $V_{rel,i}$ is a relative velocity of detected object i-in relation to the ego vehicle. Also receiving the ego vehicle velocity $V_{ego}$.

Step 810 may be followed by step 820 of calculating for each object the perception field $f_\theta(X_{rel,i}, V_{rel,i}, V_{ego}, i)$.

Step 820 may be followed by step 830 of summing the contributions from individual perception fields. Step 830 may also include normalizing so that the magnitude of the resulting 2d vector is equal to the highest magnitude of the individual terms: $N * \Sigma f_\theta(X_{rel,i}, V_{rel,i}, V_{ego}, i)$.

Step 830 may be followed by step 840 of constructing a differential equation that describes ego acceleration applied on the ego vehicle: $a = N * \Sigma f_\theta(X_{rel,i}, V_{rel,i}, V_{ego}, i)$ This may be the output of the inference process. Step 840 may be followed by step 450 (not shown).

The method may include updating the one or more network parameters.

The method may include step 860 of computing ego trajectory given initial conditions $\hat{X}(t;x_0,v_0)$ Step 860 may be followed by step 870 of computing a loss function=$\Sigma(\hat{X}(t;x_0,v_0))-x(t;x_0,v_0))^2$. And propagating the loss accordingly.

FIG. 9 illustrates method 900 inference with the addition of a loss function for an adaptive cruise control model implemented with kinematic variables as inputs.

Step 910 of method 900 may include receiving a location of the ego vehicle $X_{ego}$, the speed of the ego vehicle $V_{ego}$, the location of the nearest vehicle in front of the ego vehicle $X_{CIPV}$, and the speed of the nearest vehicle in front of the ego vehicle $V_{CIPV}$.

Step 910 may be followed by step 920 of calculating the relative location $X_{rel}=X_{ego}-X_{CIPV}$, and the and the relative speed $V_{rel}=V_{ego}-V_{CIPV}$.

Step 920 may be followed by step 930 of:
Calculating, by a first NN, a perception field function $g_\theta(X_{rel}, V_{CIPV})$
Calculating, by a second NN, an auxiliary function $h_\psi(V_{rel})$
Multiplying $g_\theta(X_{rel}, V_{CIPV})$ by $h_\psi(V_{rel})$ to provide a target acceleration (which equals the target force).

This may be the output of the inference process. Step 930 may be followed by step 450 (not shown).

The method may include updating the one or more NN parameters.

The method may include step 960 of computing ego trajectory given initial conditions $\hat{X}(t;x_0,v_0)$.

Step 960 may be followed by step 970 of computing a loss function=$\Sigma(\hat{X}(t;x_0,v_0))-x(t;x_0,v_0))^2$. And propagating the loss accordingly.

Taking into account a desired path of the vehicle

A vehicle may perform a driving session in order to reach a destination.

At a given moment, the vehicle may be positioned at a segment of a path that reaches the destination. This segment is referred to as a local segment. Other segments of the path may be more distant than the local segment.

The local segment may include a segment of a road in which the vehicle is located, or may include more than a single segment of one or more roads. The segment of the road may be of any length—for example between 2-500 meters and even more. The segment of the road may be defined based on the path to the destination—for example the segment may terminate once the path required to proceed to another road.

At the given moment the vehicle is aware of coarse navigation information. The coarse navigation information may describe or provide an indication of at least the local segment of the path.

The coarse navigation information is coarse in the sense that is does not define the exact progress of the vehicle within the local segment. The exact progress of the vehicle within the local segment is to be fine-tuned.

For example—the coarse navigation information may define a road segment—but does not define in which lane to progress, when to change lanes, and the like. Yet for another example—the coarse navigation information may define the road lane—but not how to drive within the lane.

The fine tuning may be based on the coarse navigation information and based on the presence, within the environment of the vehicle or one or more objects that may impact the behavior of the vehicle.

Figure 10:
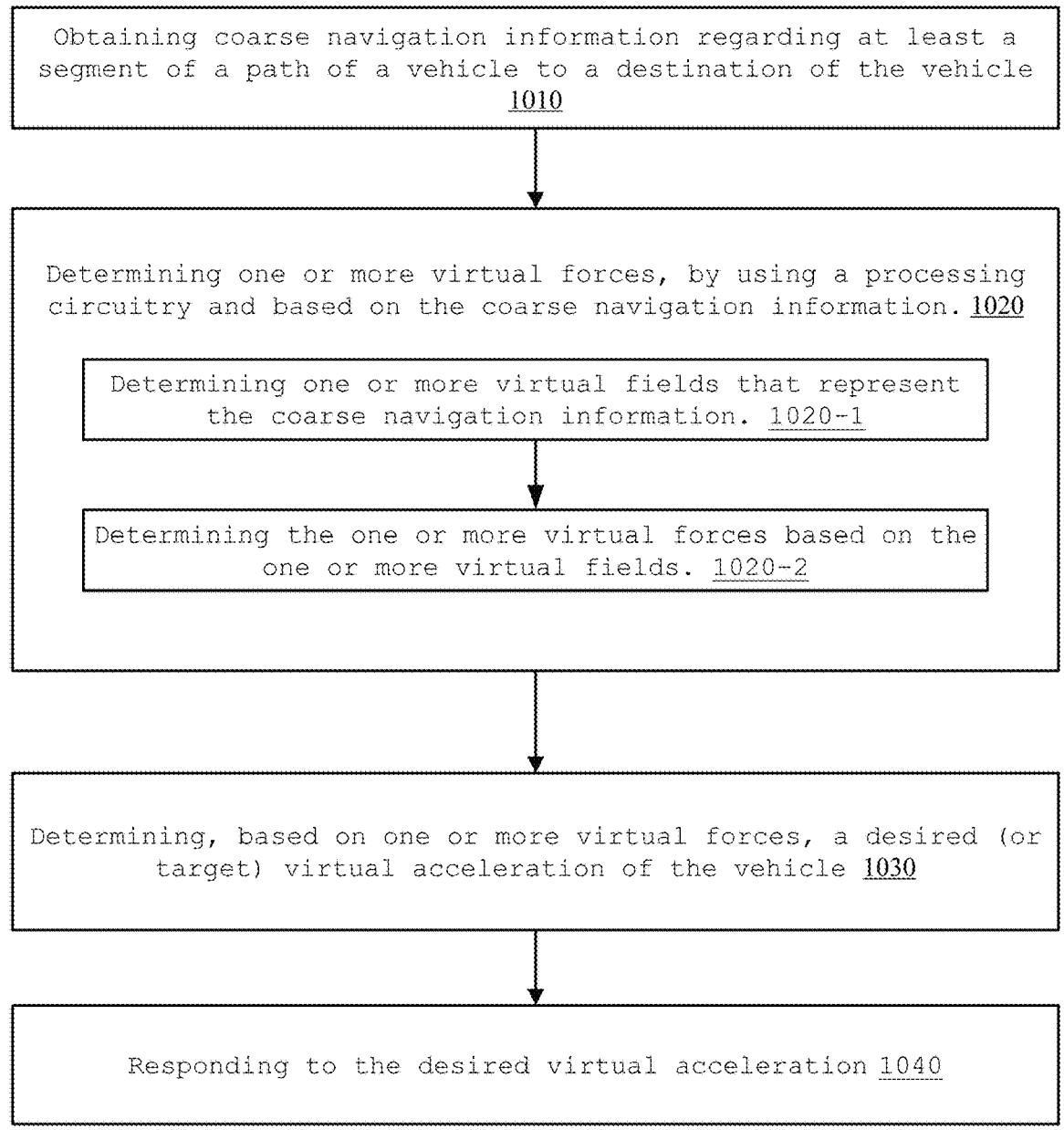
FIG. 10 illustrates an example of a method.

FIG. 10 illustrates an example in which the fine tuning is executed based on the coarse navigation information.

FIG. 10 illustrates an example of method 1000 for virtual fields driving related operations.

Method 1000 is a computerized method executed by a processing circuitry.

According to an embodiment, method 1000 starts by step 1010 of obtaining coarse navigation information regarding at least a segment of a path of a vehicle to a destination of the vehicle.

Step 1010 may include receiving the coarse navigation information, generating the coarse navigation information, participating in a processing of the coarse navigation information, processing only a part of the coarse navigation information and/or receiving only another part of the coarse navigation information.

The coarse navigation information may be provided an a navigation application such as GOOGLE MAPS™, WAZE™, by a navigation application executed by a drivers device, by a vehicle device (such as a multimedia system), may be communicated from a computerized system located outside the vehicle, and the like.

Step 1010 is followed by step 1020 of determining one or more virtual forces, by using a processing circuitry and based on the coarse navigation information.

According to an embodiment, step 1020 includes step 1020-1 of determining one or more virtual fields that represent the coarse navigation information. Step 1020-1 may be followed by step 1020-2 (of step 1020) of determining the one or more virtual forces based on the one or more virtual fields.

The one or more virtual forces are for use in applying a driving related operation of the vehicle, the one or more virtual forces belong to a virtual physical model and represent, at least in part, the coarse navigation information.

According to an embodiment, the coarse navigation information is represented by one or more virtual fields and the virtual physical model may provide a mapping between the one or more virtual fields and the one or more virtual forces.

According to an embodiment, the virtual physical model may also define the one or more virtual fields.

According to an embodiment, the determining of the one or more virtual forces are responsive to a location of the vehicle.

According to an embodiment, the determining of the one or more virtual forces are responsive to motion information of the vehicle.

Step 1020 may apply the same calculation as applied during step 440 of FIG. 4—while applying the calculation on the coarse navigation information instead of applying the calculations on object information.

Step 1020 may apply a calculation that differs from the calculation applied during step 440 of FIG. 4.

According to an embodiment, step 1020 includes analyzing the coarse navigation information with respect to a location of the vehicle. This may include finding the local segment.

The one or more virtual fields may be virtually generated from one or more virtual field sources having one or more locations that are determined based on the coarse navigation information. For example—a virtual field source may be located on the local segment of the path. For example—assuming that the coarse navigation information defined a segment on the road to be passed by the vehicle—a virtual field source may be located on that road segment or in proximity to the vehicle. Proximity—for example between 2-100 meters from the vehicle—or even larger distances from the vehicle. Additionally or alternatively—the proximity may be defined by the path of the vehicle-whether the path include multiple path changes that are close to each other, whether the vehicle is located within a urban environment, whether the vehicle is located within an array of junctions that are proximate to each other, whether the vehicle is drives along a road that has sparse junctions—for example a junction each 5-10 kilometers or more.

The one or more virtual fields may include an attractive virtual field. The attractive virtual field may induce the vehicle to progress towards the destination.

The one or more virtual fields may include a repelling virtual field.

According to an embodiment—the coarse navigation information may also include information about one or more traffic rules to be applied along the path—for example a maximal allowable speed. In this case the one or more virtual fields may be responsive to the one or more traffic rules—for example may be defined in view of the maximal allowable speed. For example—the magnitude of a virtual field may be defined such that a virtual force (calculated during step 1030) that represents the virtual field will prevent the vehicle from propagating at a speed that exceeds the maximal allowable speed. The maximal speed limitation or any other traffic rule limitation may be represented by a dedicated virtual force and/or dedicated virtual field. The maximal rule limitation may be enforced by amending a desired virtual acceleration (calculated during step 1030) to provide a desired virtual acceleration that one applied will not cause the vehicle to exceed the maximal rule limitation. The amendment may be skipped in emergency situations such as imminent collision situations.

According to an embodiment, step 1020 is followed by step 1030 determining, based on one or more virtual forces, a desired (or target) virtual acceleration of the vehicle—for example based on the equivalent of Newton's second law. The desired virtual acceleration may be a vector—or otherwise have a direction.

The one or more virtual forces may be combined to provide an aggregate virtual force that is virtually applied on the vehicle. The aggregate virtual force has an aggregate virtual acceleration.

According to an embodiment—the desired virtual acceleration may have the same magnitude as the aggregate virtual acceleration—but may be directed in an opposite direction.

According to an embodiment—the desired virtual acceleration may have an magnitude that differ from the magnitude of the aggregate virtual acceleration.

According to an embodiment—the desired virtual acceleration may have a direction that is not opposite to a direction of the aggregate virtual acceleration.

According to an embodiment—the desired virtual acceleration may be valid for a certain period of time (for example—between 1-10 seconds, between 2-20 seconds, between 2-60 seconds, up to 2-5 minutes, or over longer periods).

According to an embodiment, the fine tuning of the path of the vehicle requires performing multiple determination of the desired virtual acceleration.

According to an embodiment, step 1030 is followed by step 1040 of responding to the desired virtual acceleration.

Step 1040 may include at least one of:

Triggering a calculation of one or more vehicle driving operations that will cause the vehicle to propagate according to the desired virtual acceleration.

Triggering an execution of one or more vehicle driving operations that will cause the vehicle to propagate according to the desired virtual acceleration Calculating the of one or more vehicle driving operations that will cause the vehicle to propagate according to the desired virtual acceleration.

Executing the of one or more vehicle driving operations that will cause the vehicle to propagate according to the desired virtual acceleration.

Triggering a generating of a user graphical interface for displaying at least one out of (i) the one or more virtual fields, (ii) the one or more virtual forces, or (iii) the desired acceleration.

Generating of a user graphical interface for displaying at least one out of (i) the one or more virtual fields, (ii) the one or more virtual forces, or (iii) the desired acceleration.

Displaying, by a user graphical interface, displaying at least one out of (i) the one or more virtual fields, (ii) the one or more virtual forces, or (iii) the desired acceleration.

For example—step 1040 may include translating the desired acceleration to an acceleration or deceleration of the vehicle or to a changing direction of progress of the vehicle—using gas pedal movement, brake pedal movement and/or steering wheel angle.

Steps 1020, 1030 and 1040 may be executed by the same a processing circuitry. Alternatively—two or more steps of steps 1020, 1030 and 1040 may be executed by different processing circuitries. For example—step 1020 is executed by a first processing circuitry, step 1030 is executed by a second processing circuitry that differs from the first processing circuitry, and step 1040 is executed by a third processing circuitry that differs from each one of the first and second processing circuitries. Yet for another example—two steps of steps 1020, 1030 and 1040 are executed by the same processing circuitry and the other step of steps 1020, 1030 and 1040 is executed by another processing circuitry.

Figure 11:
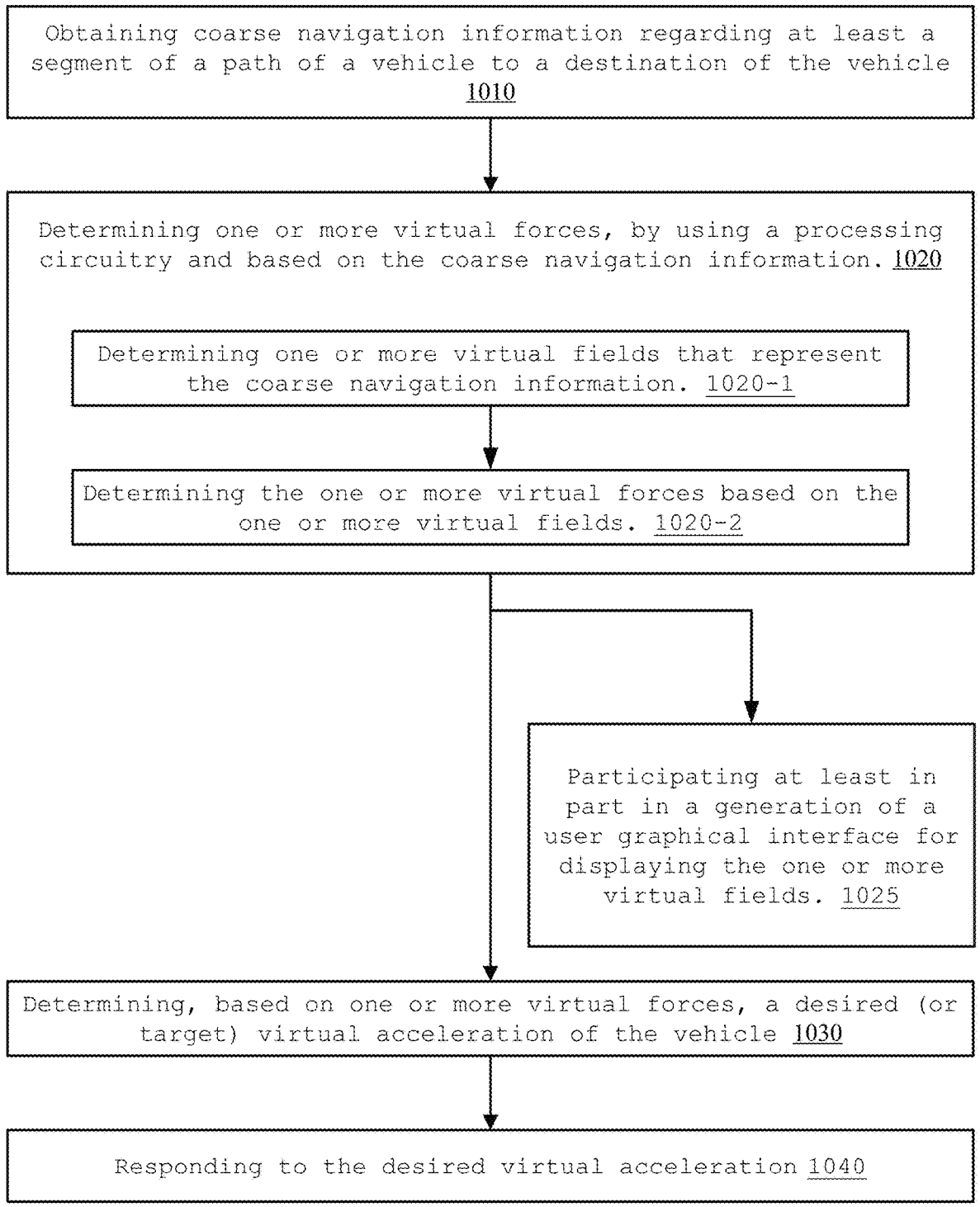
FIG. 11 illustrates an example of a method.

FIG. 11 illustrates an example of method 1001 for virtual fields driving related operations.

Method 1001 is a computerized method executed by a processing circuitry.

Method 1001 includes steps 1020, 1030 and 1040.

Method 1001 differs from method 1000 of FIG. 10 by further including step 1025.

Step 1025 follows step 1020 and includes participating at least in part in a generation of a user graphical interface for displaying the one or more virtual fields. Step 1025 may include triggering the generation of the user graphical interface, generating the user graphical interface, performing some of the steps required for providing the user graphical interface (for example determining some of the instructions that once executed cause the display of the user graphical interface).

Figure 12:
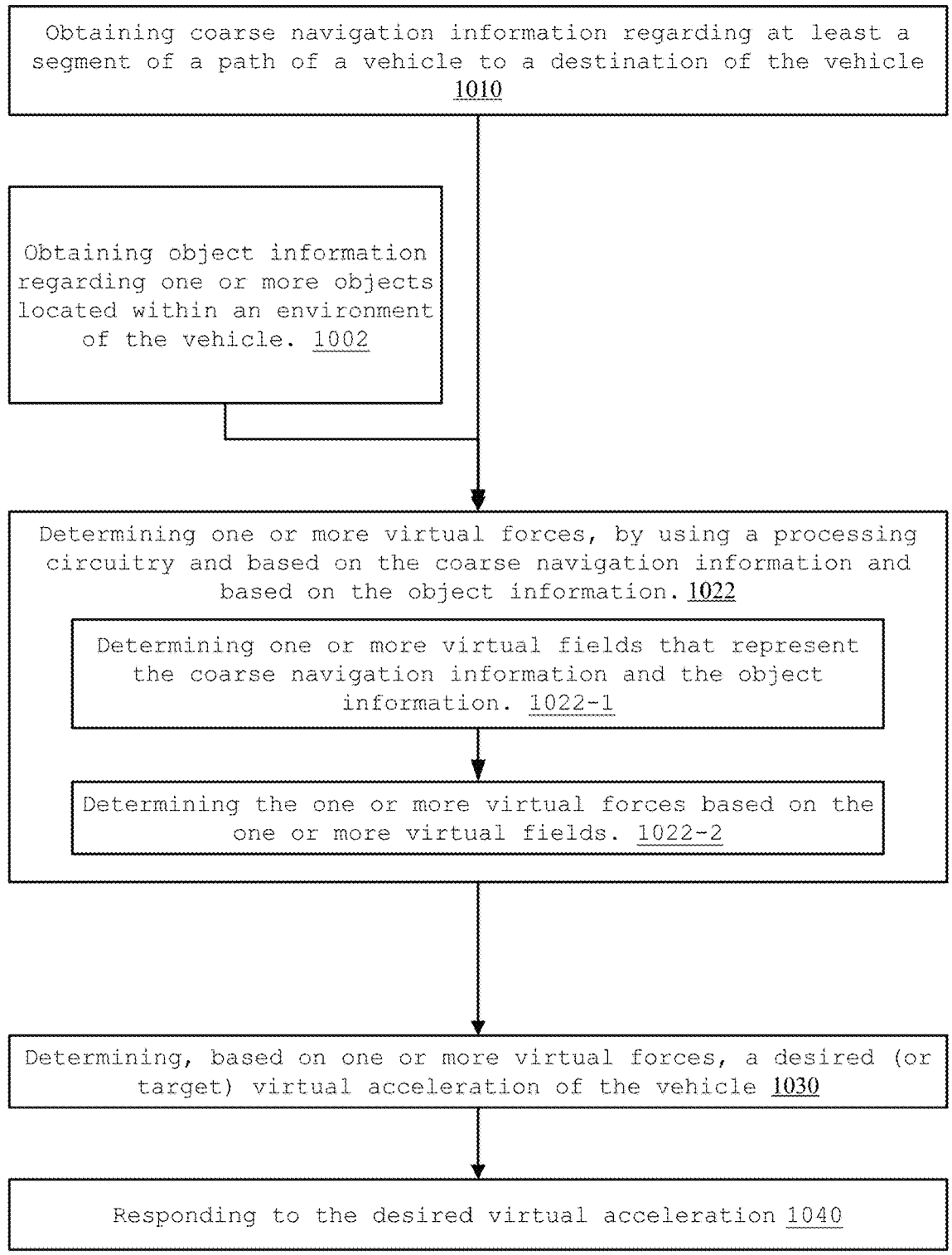
FIG. 12 illustrates an example of a method.

FIG. 12 illustrates an example of method 1002 for virtual fields driving related operations.

Method 1002 of FIG. 12 differs from method 1000 of FIG. 10 by taking into account object information regarding one or more objects located within an environment of the vehicle.

According to an embodiment, method 1002 includes step 1010 of obtaining coarse navigation information regarding at least a segment of a path of a vehicle to a destination of the vehicle.

According to an embodiment, method 1002 includes step 1012 of obtaining object information regarding one or more objects located within an environment of the vehicle.

Step 1010 and step 1012 are followed by step 1022 of determining one or more virtual forces, by using a processing circuitry and based on the coarse navigation information and based on the object information. The one or more virtual forces represent the coarse navigation information and the object information.

According to an embodiment, step 1022 includes step 1022-1 of determining one or more virtual fields that represent the coarse navigation information and the object information. Step 1022-1 may be followed by step 1022-2 (of step 1022) of determining the one or more virtual forces based on the one or more virtual fields and based on the object information.

Step 1022 may also be based on location information related to the vehicle and/or movement information related to the vehicle.

According to an embodiment, step 1022 is followed by step 1030 of determining, based on one or more virtual forces, a desired (or target) virtual acceleration of the vehicle.

The one or more virtual forces represent the impact of the coarse navigation information and of the object information on the behavior of the vehicle.

A virtual force may be determined based on the object information and the coarse navigation information.

A virtual force may be determined based on the object information and not based on the coarse navigation information.

A virtual force may be determined based on the coarse navigation information and not based on the object information.

According to an embodiment, step 1030 is followed by step 1040 of responding to the desired virtual acceleration.

Figure 13:
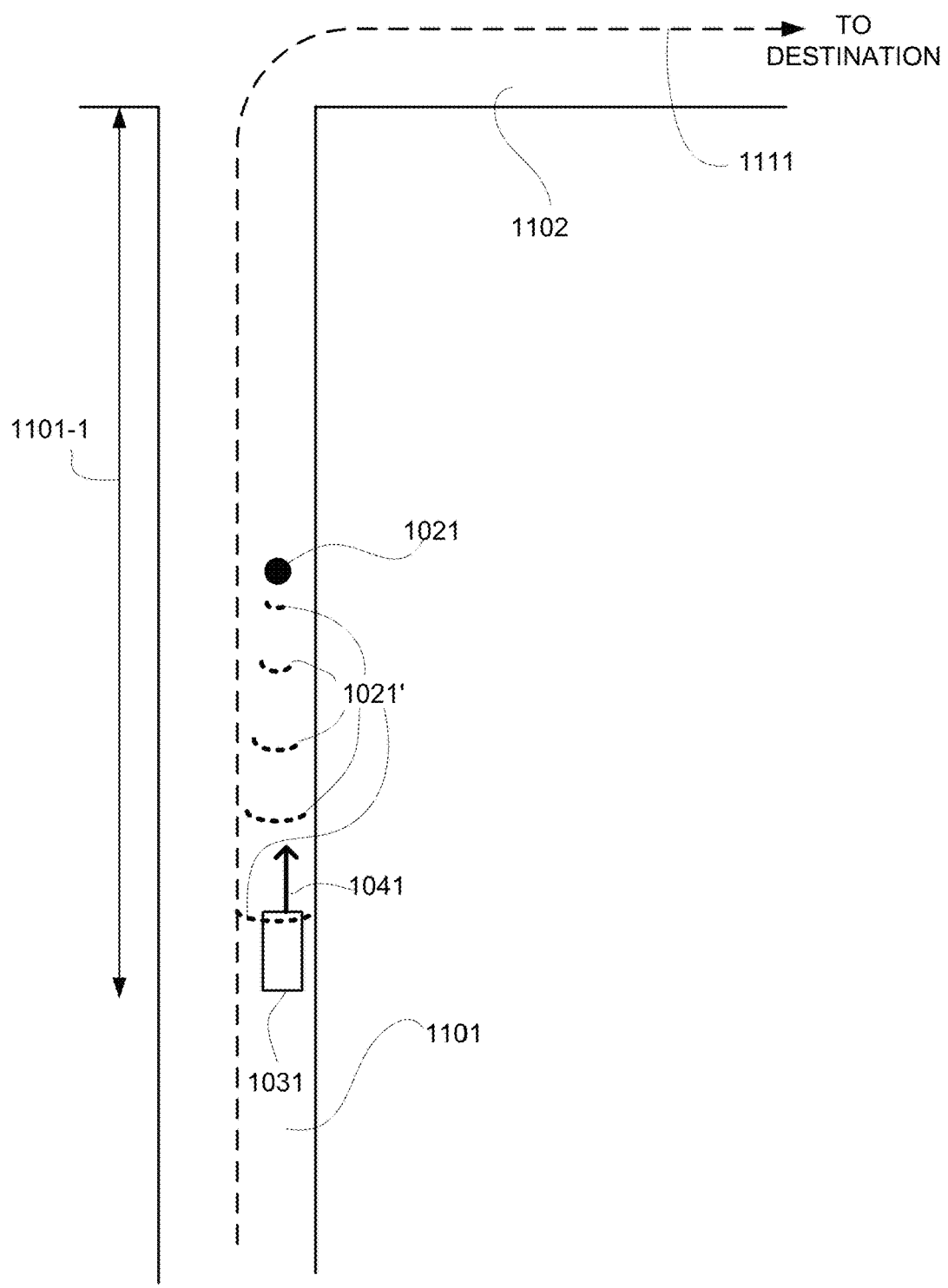
FIG. 13 illustrates an example of a secne.

FIG. 13 illustrates an example of a secne.

FIG. 13 illustrates an example of vehicle 1031 that is located within a segment 1011-1 of a first road 1011. Coarse navigation information is represented by dashed line 1111 that passes through the first road 1011 and then proceeds to second road 1102.

A virtual field source 1201 that represents the coarse navigation information generates a virtual field (illustrated by virtual equipotential field lines 1021') that attracts vehicle 1031 to proceed along the path associated with dashed line 1101.

FIG. 13 also illustrates a desired virtual acceleration 1041 that should be followed by the vehicle 1031.

Figure 14:
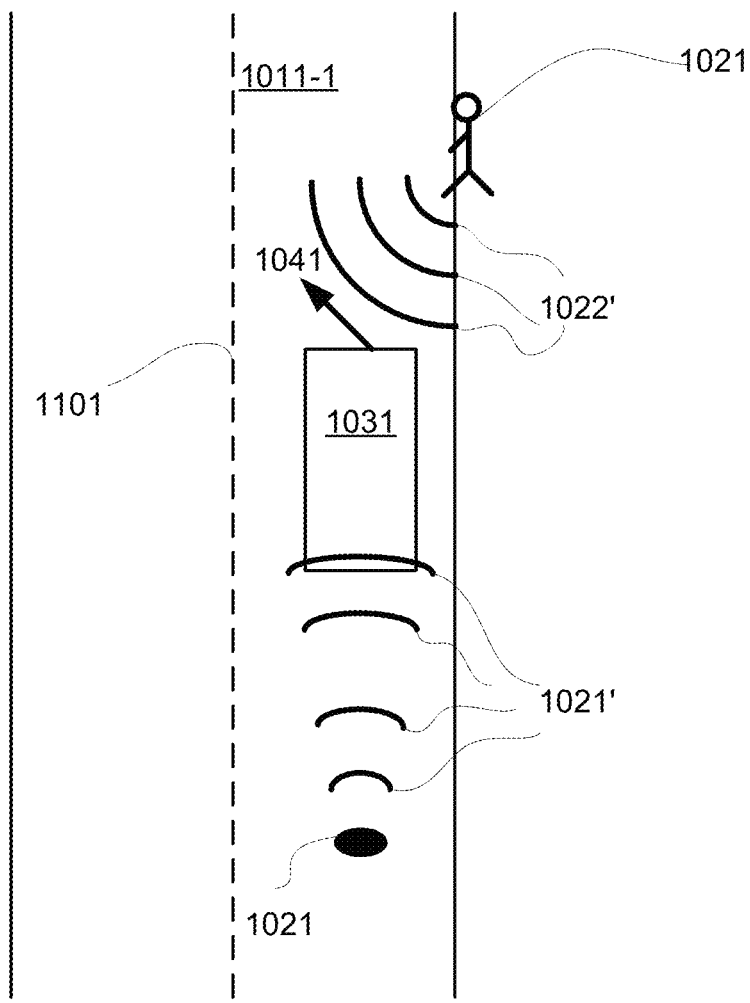
FIG. 14 illustrates an example of a secne.

FIG. 14 illustrates an example of vehicle 1031 that is located within a segment 1011-1 of a first road. Coarse navigation information is represented by dashed line 1111 that passes through the first road 1011.

A first virtual field source 1201 that represents the coarse navigation information generates a virtual field (illustrated by virtual equipotential field lines 1021') that repels vehicle 1031 and cause vehicle 1031 to proceed along the path associated with dashed line 1101.

FIG. 14 also illustrates a pedestrian 1022 that starts crossing the segment—in front of the vehicle 1301. The pedestrian is represented by a second virtual field (illustrated by virtual equipotential field lines 1022') that repels vehicle 1031.

FIG. 14 also illustrates a desired virtual acceleration 1041 that should be followed by the vehicle 1031.

The first and second virtual fields are taken into account when calculating an aggregate virtual force that is virtually applied on the vehicle. The desired virtual acceleration 1041 of vehicle 1031 takes into account the aggregate virtual force.

The desired virtual acceleration 1041 of vehicle 1031 may be calculated based on the first and second virtual fields—with or without the calculation of the aggregate virtual force.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein. Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for virtual fields driving related operations, the method comprises:
   obtaining navigation information regarding at least a segment of a path of a vehicle to a destination of the vehicle, and traffic rule information about a traffic rule applied related to the path;
   determining one or more virtual forces, by using a processing circuitry and based on the navigation information and on the traffic rule information, the one or more virtual forces are for use in applying a driving related operation of the vehicle, the one or more virtual forces belong to a virtual physical model and represent, at least in part, the navigation information;
   determining, based on the one or more virtual forces, a desired virtual acceleration of the vehicle; and
   triggering an execution of one or more vehicle driving operations that will cause the vehicle to propagate according to the desired virtual acceleration;
   wherein the traffic rule is a maximal speed value, wherein the desired virtual acceleration is applicable to prevent the vehicle from exceeding the maximal speed value; and
   wherein the method comprises defining the desired virtual acceleration applicable in an emergency situation to cause the vehicle to exceed the maximal speed value.

2. The method according to claim 1, comprising analyzing the navigation information with respect to a location of the vehicle.

3. The method according to claim 1, wherein the determining of the one or more virtual forces comprises obtaining one or more virtual fields that are associated with the navigation information, wherein the traffic rule is represented by a dedicated virtual force or by a dedicated virtual field.

4. The method according to claim 1, wherein the determining of the one or more virtual forces comprises obtaining one or more virtual fields that are associated with the navigation information; wherein the one or more virtual fields comprise at least one of an attractive virtual field and a repelling virtual field.

5. The method according to claim 1, wherein the determining of the one or more virtual forces comprises obtaining one or more virtual fields that are associated with the navigation information; wherein the method further comprises determining a magnitude of a virtual field of the one or more virtual fields, such that a virtual force corresponding to the virtual field is applicable to prevent the vehicle from violating the traffic rule.

6. The method according to claim 1, wherein the determining of the one or more virtual forces comprises obtaining one or more virtual fields that are associated with the navigation information , wherein the method further comprises generating a user graphical interface for displaying of the one or more virtual fields.

7. The method according to claim 1, comprising obtaining, during the driving session, object information regarding one or more objects located within an environment of the vehicle; wherein a virtual force of the one or more virtual forces is indicative of an impact of an object of the one or more objects on a behavior of the vehicle.

8. The method according to claim 7, wherein the one or more virtual forces are multiple virtual forces that comprises a virtual force that represents an impact of an object of the one or more objects and a virtual force that represents the navigation information.

9. The method according to claim 7, wherein the determining of the one or more virtual forces is also based on at least one of location information related to the vehicle and movement information related to the vehicle.

10. A non-transitory computer readable medium that stores instructions that once executed by a processing circuitry causes the processing circuitry to:
   obtain navigation information regarding at least a segment of a path of a vehicle to a destination of the vehicle, and traffic rule information about a traffic rule applied related to the path;

determine one or more virtual forces, by using a processing circuitry and based on the navigation information, the one or more virtual forces are for use in applying a driving related operation of the vehicle, the one or more virtual forces belong to a virtual physical model and represent, at least in part, the navigation information;

determine, based on the one or more virtual forces, a desired virtual acceleration of the vehicle; and trigger an execution of one or more vehicle driving operations that will cause the vehicle to propagate according to the desired virtual acceleration;

wherein the traffic rule is a maximal speed value, wherein the desired virtual acceleration is applicable to prevent the vehicle from exceeding the maximal speed value; and wherein the non-transitory computer readable medium further stores instructions for defining the desired virtual acceleration applicable in an emergency situation to cause the vehicle to exceed the maximal speed value.

11. The non-transitory computer readable medium according to claim 10, wherein the determining of the one or more virtual forces comprises obtaining one or more virtual fields that are associated with the navigation information;

wherein the traffic rule is represented by a dedicated virtual force or by a dedicated virtual field.

12. The non-transitory computer readable medium according to claim 10, wherein the determining of the one or more virtual forces comprises obtaining one or more virtual fields that are associated with the navigation information;

wherein the non-transitory computer readable medium further stores instructions for generating a user graphical interface for displaying of the one or more virtual fields.

13. The non-transitory computer readable medium according to claim 10, that stores instructions for obtaining, during the driving session, object information regarding one or more objects located within an environment of the vehicle.

14. The non-transitory computer readable medium according to claim 13, wherein the determining of the one or more virtual forces is based also on the object information, wherein the one or more virtual forces also represent one or more impacts of the one or more objects on a behavior of the vehicle.

15. The non-transitory computer readable medium according to claim 13, wherein the one or more virtual forces are multiple virtual forces that comprise a virtual force that represents an impact of an object of the one or more objects and a virtual force that represents the navigation information.

16. The non-transitory computer readable medium according to claim 13, wherein the determining of the one or more virtual forces is also based on at least one of location information related to the vehicle and movement information related to the vehicle.

* * * * *